(12) United States Patent
Mudulodu

(10) Patent No.: US 11,523,340 B2
(45) Date of Patent: Dec. 6, 2022

(54) DELAYED PREAMBLE DETECTION FOR BLUETOOTH® RECEIVER BASED ON INTERFERER METRICS

(71) Applicant: Silicon Laboratories, Inc., Austin, TX (US)

(72) Inventor: Sriram Mudulodu, Hyderabad (IN)

(73) Assignee: Silicon Laboratories Inc., Austin, TX (US)

( * ) Notice: Subject to any disclaimer, the term of this patent is extended or adjusted under 35 U.S.C. 154(b) by 128 days.

(21) Appl. No.: 17/106,112

(22) Filed: Nov. 29, 2020

(65) Prior Publication Data
US 2022/0174597 A1  Jun. 2, 2022

(51) Int. Cl.
| | |
|---|---|
| *H04W 52/02* | (2009.01) |
| *H04W 80/02* | (2009.01) |
| *H04W 52/52* | (2009.01) |
| *H04W 4/80* | (2018.01) |
| *H04L 69/22* | (2022.01) |

(52) U.S. Cl.
CPC ......... *H04W 52/0229* (2013.01); *H04L 69/22* (2013.01); *H04W 4/80* (2018.02); *H04W 52/0216* (2013.01); *H04W 52/52* (2013.01); *H04W 80/02* (2013.01)

(58) Field of Classification Search
CPC ...... H03M 1/126; H04B 1/123; H04L 7/0016; H04L 7/042; H04L 69/22; H04W 52/0229; H04W 4/80; H04W 52/0216; H04W 52/52; H04W 80/02
See application file for complete search history.

(56) References Cited

U.S. PATENT DOCUMENTS

| | | | | |
|---|---|---|---|---|
| 8,090,035 B2* | 1/2012 | Sankabathula | ...... | H03G 3/3052 375/345 |
| 8,483,649 B2* | 7/2013 | Lee | .................. | H04W 52/0229 455/574 |
| 8,711,718 B2* | 4/2014 | Su | ..................... | H04W 52/0229 370/252 |
| 9,497,130 B2* | 11/2016 | Gong | ..................... | H04W 88/02 |
| 10,002,045 B2* | 6/2018 | Chung | ............... | G06F 11/1068 |
| 10,210,090 B1* | 2/2019 | Olorode | ............. | G06F 12/0215 |
| 11,284,360 B1* | 3/2022 | Wu | ......................... | H04L 1/201 |
| 2005/0025080 A1* | 2/2005 | Liu | ........................ | H04L 69/323 370/389 |
| 2015/0334648 A1* | 11/2015 | Ansari | ................... | H04W 48/12 370/311 |
| 2019/0059055 A1* | 2/2019 | Murali | ............. | H04W 52/0229 |
| 2019/0191373 A1* | 6/2019 | Mudulodu | ............... | H04B 1/16 |

* cited by examiner

*Primary Examiner* — Hassan A Phillips
*Assistant Examiner* — Hicham B Foud
(74) *Attorney, Agent, or Firm* — File-EE-Patents.com; Jay A. Chesavage

(57) ABSTRACT

The present invention relates to a method and apparatus for reducing power consumption in a receiver of a time slotted communication system. An RF front end has power applied after the start of a preamble or after the start of a header, or upon the start of a packet payload based on connection status, signal level, and interference level. Where the signal level is constant, the communication system is in a connected state, and the interference level is low, the system bypasses packet header destination address matching, or optionally, uses only the least significant bits of the header destination address for matching purposes.

23 Claims, 3 Drawing Sheets

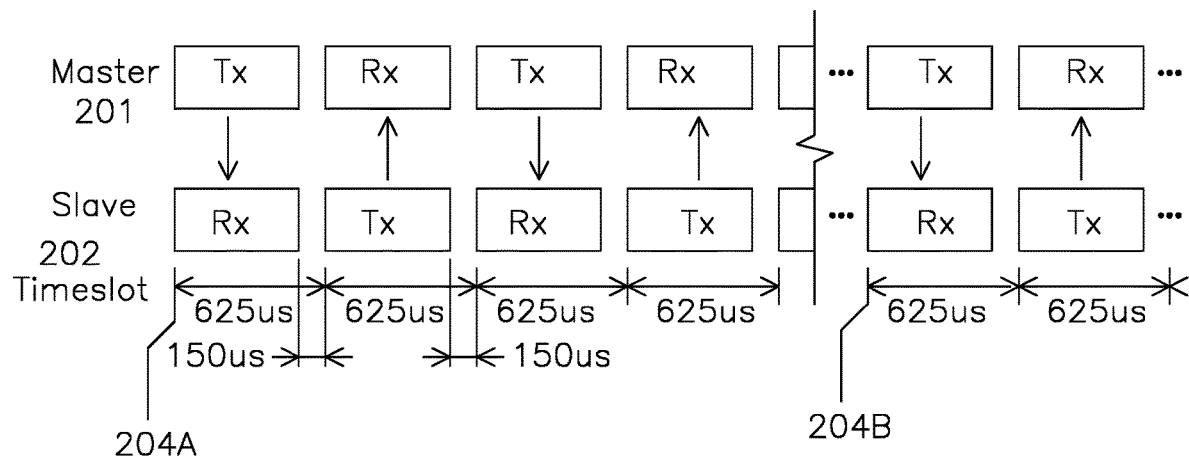

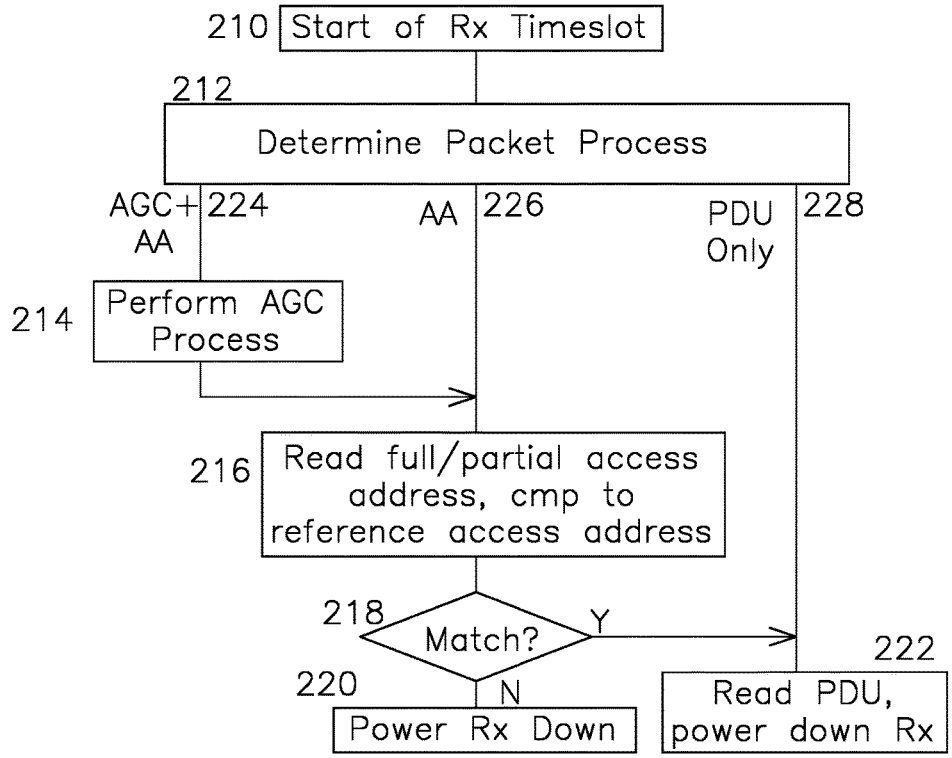
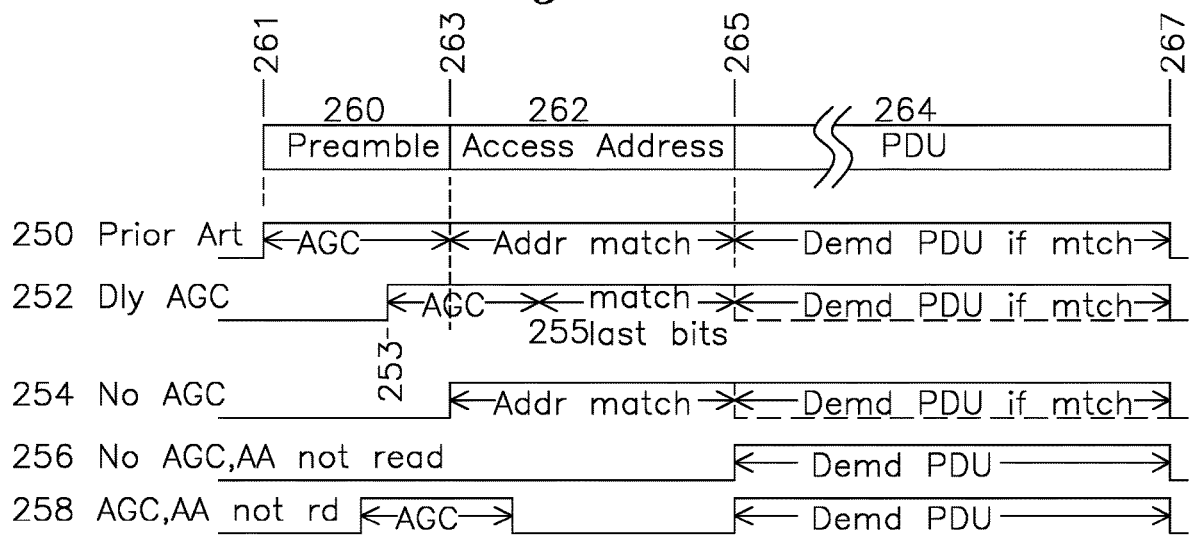

WLAN Receiver/Processor

DELAYED PREAMBLE DETECTION FOR BLUETOOTH® RECEIVER BASED ON INTERFERER METRICS

FIELD OF THE INVENTION

The present invention relates to reducing power consumption in a communication system. In particular, the invention relates to a method and apparatus for reducing power consumption in a receiver of a time slotted communication system such as Bluetooth®.

BACKGROUND OF THE INVENTION

In typical wireless communication systems, communication is in the form of bursts of packets or frames which may occur in irregular intervals (such as any of the 802.11 Wireless Local Area Network (WLAN) protocols, or at regular intervals, such as the Bluetooth wireless protocol (described at web address www-bluetooth-org where dashes are replaced by "." to form the web uniform resource locator url). For the example of packets transmitted on regular timeslots, the transmitted frames contain, in sequence, a preamble, control information such as an identifier or header which is used to determine whether the frames are intended for the receiving device, and payload data (known as protocol data unit, or PDU). One such example is BLE (Bluetooth Low Energy, as described in the Bluetooth specifications at version 5.2, incorporated herein by reference) with a bit data rate of 1 MBPS as shown in FIG. 1 with the sequence of a 1-Byte preamble 102 indicating the start of packet, followed by 4-Byte access address 104, then the protocol data unit (PDU) 106 and ending with a Cyclic Redundancy Check (CRC) 108 which is operative over the entire frame except the preamble 102. Another Bluetooth Low Energy protocol referred to herein as BLR (Bluetooth Long Range) extends the BLE packet fields to support Long Range connections using longer fields, lower data rates, and error correcting codes. These Bluetooth protocols are operative in the Industrial, Scientific and Medical (ISM) frequency band, similar to the 802.11 series of Wireless Local Area Network (WLAN) protocols, although WLAN uses different modulation methods including Direct Sequence Spread Spectrum (DSSS) operative over several channels and Orthogonal Frequency Division Multiplexing (OFDM) operative in discrete channels, rather than the Gaussian frequency shift keying (GFSK) modulation method of Bluetooth and ANT (www-thisisant-com).

The preamble portion of the Bluetooth packet is delivered as a known fixed repetitive GFSK pattern which is used for packet detection and to estimate and correct the impairments introduced in the channel through which the radio frequency (RF) travels. The header field 104 which follows the preamble includes a layer 2 destination address (known as a 4 byte Access Address field in Bluetooth) which needs to be decoded by the receiving station to determine whether the packet is intended for the station receiving the packet, using an addressing system where each receiving slave station has an initial station address and is later assigned a unique address by a master, either of which is saved locally as a reference access address. An Automatic Gain Controller (AGC) block in the communication system iteratively measures and applies gains by using samples from the preamble to set the required gain for the received frame.

In the prior art, the receiver is powered on and operative continuously through the fields of a received packet, the fields including a preamble, a packet L2 header including a layer 2 address such as an access address (AA) with an identifier for the destination station address, and a payload, the payload also known as packet data unit (PDU). It is desired to provide an apparatus and process for selectively powering on and off the receiver to reduce power consumption for packets by enabling and disabling the receiver in manners specific to the station of connection and interference or noise level without loss of the packet PDU information to be received.

OBJECTS OF THE INVENTION

A first object of the invention is a method for reducing power consumption of a receiver receiving packets in designated time slots, the method operative to delay powering the receiver based on connection status and signal and/or interference level according to at least one method:

In a first method, when the connection status is "connected" and the signal level is high and/or interference level is low, receiver powerup is delayed such that the full preamble is missed use by an AGC process, and the powerup of the receiver occurs after the expected start of the preamble, and only a later part of the preamble and optionally part of the subsequent access address field are used for performing automatic gain control (AGC) by using a previous AGC value as a starting AGC value in the AGC process, and thereafter receiving and comparing the remaining part of the access address (AA) field containing a destination address, and when the destination address matches, applying power during a subsequent PDU field.

In a second method, when the signal level has been stable and the connection state is "connected", it is not necessary to perform an automatic gain control (AGC) process during the preamble, the receiver remains in a power down state through the expected time of packet preamble until the access address field, and a controller examines all or part of the access address field for a full or partial address match and thereafter, for an address match, the controller maintains application of power to the receiver through the PDU field and processing the PDU;

In a third method, when the signal level is stable and it is not necessary to perform an automatic gain control (AGC) process during the preamble, and a connection is established with a remote master (the station is in a "connected" state) or it is not necessary to examine the access address for a match, the receiver remains powered down until shortly before the PDU field, and begins to directly receive the packet without an AGC process or examination of the L2 header with destination address (such as AA) field;

In a fourth method, when it is necessary to establish a timing boundary at the start of a preamble, or to perform an AGC process without examination of an access address field, the receiver is enabled only during a part of the preamble interval, powered down, and then powered on again during the entirety of the PDU interval without examination of the AA field.

A second object of the invention is a station having a receiver coupled to a controller, the controller examining signal strength and connection status of the station, enabling the receiver for an AGC process based on signal strength and connection status, and examining all or part of an access address field for a match to a reference address, and determining whether to remain powered on and receive an associated PDU based on the received part of the access address field.

SUMMARY OF THE INVENTION

According to one aspect of the invention, there is provided a method for reducing power consumption in a station having a receiver operative in regular time slots, the method operative on a packet having a preamble, header, and payload, the station having connection status to a master and a previous AGC level, the method comprising:

waking up the receiver after a turn on delay from start of a time slot;

based on connection status and signal strength and/or interference level, powering up the receiver to perform an AGC process for a duration sufficient to adjust a receiver gain, the adjustment of receiver gain using an initial gain value from the previous AGC value on a part of a preamble or access address field of a packet when variations in signal strength and/or interference level are below a threshold;

when a connection status is connected and prior variations in signal strength and/or interference level below a threshold, receiving and examining part of an access address of the header to determine whether a complete or partial reference address match to a station address is present;

where an address match is found, maintaining power to the receiver and receiving and processing the packet payload, otherwise turning power off when a complete or partial reference address match is not found.

According to second aspect of the invention, there is provided a controller for reducing power consumption in a station for a time slotted communication system comprising: an RF module receiving a radio frequency (RF) signal for conversion to an intermediate or baseband frequency and delivery to an analog to digital converter (ADC), the RF module having a variable gain controlled by an AGC process, the controller configured to wake up at least one function of a receiver after a turn on delay from start of a time slot according to a wake-up condition; the wake-up condition being at least one of: performing an AGC process using either a preamble or an access address part of a received packet header and powering down the RF module and ADC until the time corresponding to a PDU interval of a received packet; or performing an address match test on part of or all of an access address part of a packet, the receiver powering down if the full or partial access address does not match a reference access address associated with the receiver.

BRIEF DESCRIPTION OF THE DRAWINGS

FIG. 1 illustrates a prior art Bluetooth Low Energy (BLE) Packet format.

FIG. 2A illustrates a progression of time slots for master/slave Bluetooth communication.

FIG. 2B is a flowchart of an example method for reducing power consumption in a receiver of a communication system.

FIGS. 2C is a timing diagrams for various methods for reducing power consumption of a Bluetooth receiver.

DETAILED DESCRIPTION OF THE INVENTION

Figure 3:
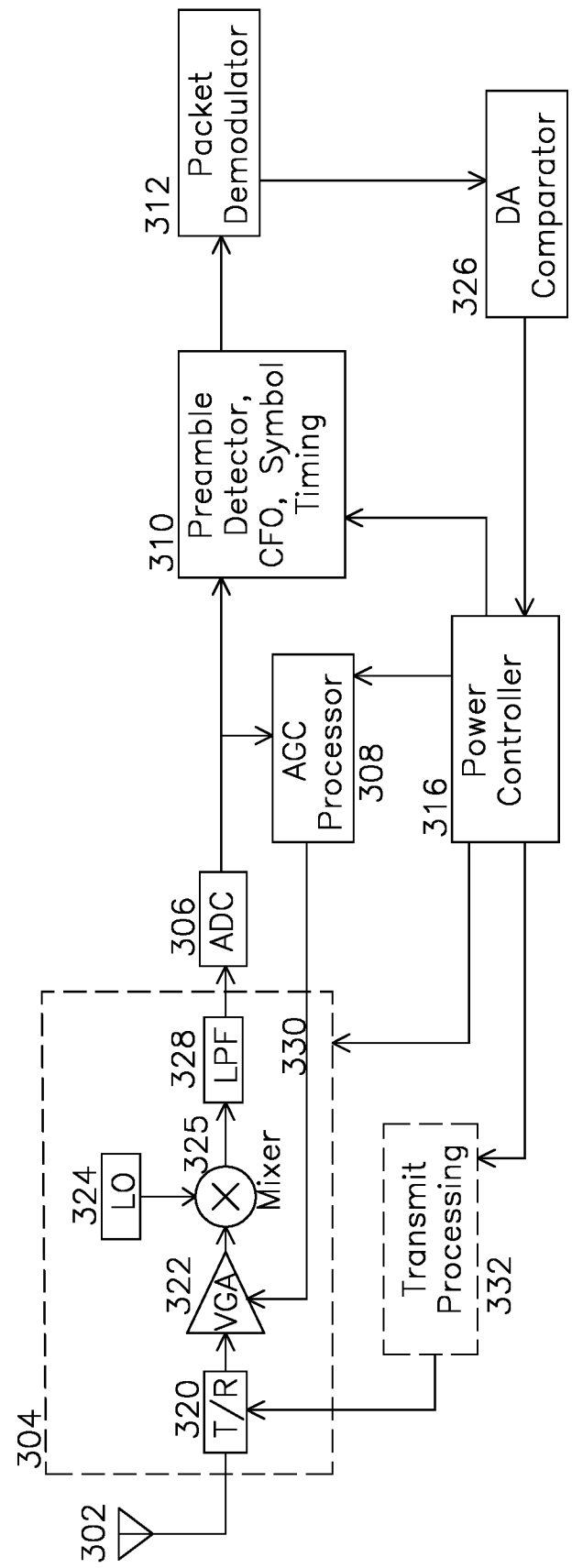
FIG. 3 is a block diagram of a communication system in an example of the present invention.

In the present invention, reference is made to a "station", generally referring to a slave station in a Bluetooth piconet, which comprises one or more stations which are connected to a "master" according to the Bluetooth specification. The station of the present invention saves power by removing power to certain non-essential components required to receive or process a packet or packet fields during a power-down interval, such as an RF front end, analog to digital converter (ADC), and other components not required for operation, while other components such as a power controller remain powered up to determine a subsequent wakeup interval and restore power to the components which were previously powered down in anticipation of receiving a packet. References to power-down or powerup of the station or the receiver are understood to refer to removing power or applying power to these certain non-essential components associated with packet reception, whereas it is understood that the transmitter aspects of the station are not in the scope of the present invention.

FIG. 2A shows the time slot nature of a communication protocol such as Bluetooth, where a Master 201 and a Slave station 202 are assigned alternating non-overlapping intervals of time for communication. Each time slot interval is 625 us including a 150 us guard interval, and during each 625 us interval, the master 201 and slave station 202 alternate which station is a transmitter and which station is a receiver, as shown in the time progression of FIG. 2A. Other time sequences are possible, but the sequence shown is presented for clarity in understanding the invention, and in particular that the time slot occupied by an example slave station is fixed and repetitive in nature such that a controller can apply power to the station receiver for processing of the parts of the BLE packet of FIG. 1 at specific intervals in time, such as the beginning the start of a slave receive time slot such as 204A and 204B. In a particular example of the invention, a piconet with master 201 and slave STA 202 is operative to transmit data at assigned intervals such as 204A and 204B of FIG. 2A, so the Slave STA 202 may wake up to receive a frame at time 204A and 204B, or at other times when a Bluetooth packet is arriving.

FIG. 2B illustrates an example flowchart for a method 209 for reduced power consumption in a time slotted communication system such as Bluetooth in accordance with an embodiment of the present invention. There are several types of receive sequences that a power down controller may apply, depending on the type of connection. The Bluetooth protocol provides that a station first initializes with a default shared address which the station uses until it is assigned an access address during a connection protocol. The station may be in a "not connected" state while using the shared address, and then transition to a "connected" state after being assigned an access address which is typically unique to the station receiving it. The slave station, upon receipt of each packet during the connected state, compares the incoming packet header access address with its assigned access address. If the packet header access address matches the station's assigned access address, the receiver stays powered on and receives and processes the PDU, otherwise the receiver powers down to reduce power consumption.

Prior to the establishment of a connection (the station in the "not connected" state), the preamble of each received packet may be used to perform an AGC process, however once a connection is established and the station is in a connected state, the previous packet AGC gain value may be either used as a starting point for a subsequent AGC process for a current or future packet, or alternatively, the previous AGC value may be used without performing the AGC process, so the AGC process is skipped altogether and the receiver is not powered up until the arrival of the header access address field, thereby reducing power by omitting the ADC samples and AGC process during the preamble interval. Alternatively, if the signal level of a subsequent field indicates an AGC process must be performed because the gain value is too high or too low (as determined by the maximum signal level at the ADC output), the receiver may perform the AGC process on a subsequent packet to update the receiver gain based on the previous packet. In this manner, the AGC process may be performed on a subsequent packet using the observed ADC dynamic range of the previous packet. In another example, the receiver may delay powerup and start the AGC process on part of the preamble which follows a start of the preamble when the receiver was powered down, or the AGC process may be performed on an initial part of the header, including part of the access address, using a remainder of the access address after the AGC process completes to do partial matching of the remainder of the access address containing least significant bits (LSB), comparing the LSB values to the corresponding LSB values of the assigned access address, remaining powered on if the values match. In another example of the invention, a connection is previously established from the station to a master, and the absence of other stations provides a likelihood that only the piconet master and receiving slave station are transmitting. In that example, the receiver only powers up during the PDU interval of the packet and is powered down after the PDU interval is over. For each case described above, this is possible because of the well-defined receive windows of time-slotted communication systems such as Bluetooth. In each of these examples, the receiver is powered down in segments when a particular field or fragment of a field of the packet is not being read, as well as during the PDU interval in the case where the header access address bits do not match the corresponding bits of the assigned device address. Each of these respective packet processing sequences is determined in step 212, which provides separate paths for various combinations of: AGC process, access address matching, and PDU reception. Each of these paths may be specific to particular conditions. For example, path 224 (delayed AGC process, possibly performing the AGC process into the AA field and without comparing some MSBs of the AA) may be used when signal strength is observed to change from packet to packet as determined by a history of ADC sample dynamic range, or alternatively, before a connection occurs with the station in the not connected state. Path 226 (using a previous AGC gain value and reading the L2 header such as AA only) may be selected when the connection state is not connected but when the signal level of the ADC output for previously received packets is stable and satisfactory, thereby allowing that the receiver to be powered up late such as after the preamble or start of the AA bits. In the case where the station is the only one in the piconet and the signal level is stable as determined from previously received packets, path 228 delays application of power to the receiver until the PDU, sampling and demodulating only the PDU at 222. Alternatively, path 228 may be selected after a connection is established and the signal level remains acceptable and steady. Each of these paths may be selected at different times as various conditions warrant.

FIG. 3 shows a block diagram of a receiver according to the present invention and its operation may be understood in combination with the flowchart of FIG. 2B and timing diagram of FIG. 2C. The communication system 300 may be a Bluetooth Low Energy (BLE) communication system or an ANT communication system. The station 300 includes signal processing elements such as a radio frequency (RF) front end 304, an Analog to Digital converter (ADC) 306, an automatic gain control (AGC) processor 308 for performing gain control adjustments of VGA 322, an energy detector for detecting changes in sampled signal strength which may be incorporated into AGC processor 308, CFO and symbol timing processor 310, a packet demodulator 312, a destination address (DA) comparator 326, and a power controller 316 enabling and disabling power to the RF front end 304, ADC 306, and other modules as needed. The radio frequency (RF) module 304 comprises a transmit/receive switch 320, which couples wireless signals from the antenna 302 to the variable gain amplifier (VGA) 322. The amplified RF from the VGA 322 is applied to mixer 325 which uses local oscillator (LO) 324 to mix the RF down to baseband, low pass filtered 328, and applied to the input of ADC 306. The baseband digitized stream from ADC 306 is coupled to processor 310, which performs energy change detection to determine the start of the packet, estimation of center frequency offset, and identification of symbol timing. The packet demodulator 312 is coupled to the DA comparator 326, which determines whether the address in the packet header corresponds to the assigned device address. References to the Access Address of the header are provided as an example of the invention, the AA is understood to mean any layer 2 destination address such as the Destination ID of ANT or other protocols providing a header field with a destination address which is used in combination with a station address to determine the packet is destined for the station.

The power controller 316 is operative to selectively apply power to the various signal processing elements, such as the RF front end and ADC 306 after a receiver powerup delay from start of a time slot.

In an example where the time slotted communication system is Bluetooth low energy, the receiver wakes up from a sleep state at a periodic anchor points such as 204A and 204B of FIG. 2A to receive an associated packet from the transmitter. An interpacket fixed time gap of 150 us between consecutive packets from the transmitter to the receiver prevents wireless packet interference from having more than one transmitter active at a time. The time duration between two anchor points is an integral multiple of 1.25 ms transmit/receive time slots. In one mode of operation for a partial preamble AGC process, a receiver powerup delay is measured from the beginning or starting point of the time slot or alternatively, an anchor point 204A and 204B. In an embodiment where the time slotted communication system is Bluetooth low energy, the receiver powerup delay duration is in the range of 0 us to 40 us. For a Bluetooth protocol, the 40 us duration corresponds to the duration of preamble (8 us) 102 and duration of access address (32 us) 104. In a second example where the time slotted communication system is Bluetooth Long Range (BLR), the receiver powerup delay duration is in the approximate range 0 us to 336 us, corresponding to the combined duration of preamble (80 us) 102 and duration of access address (256 us) 104. The length of the receiver powerup delay varies according to change in signal strength with respect to a previously received packet as well as variation in SINR with respect to a previous packet. In an embodiment where the packet to packet signal level varies less than 6 dB from packet to packet, the same AGC value may be reused on a subsequent packet of paths 226 and 228, or alternatively a single AGC adjustment may be made on a subsequent packet based on the previous packet signal level measured at the ADC.

In another example of the invention where the communication system is Bluetooth, the consecutive frequency channels of the Bluetooth frequency channels are grouped and assigned a receiver powerup delay value based on the interference level observed on at least one frequency channel in the group. The frequency channel group with higher interference level is assigned a lower receiver powerup delay value compared to a frequency channel group with lower interference level. A lower value of receiver powerup delay implies a larger amount of preamble or header bits are received by the receiver.

The automatic gain controller (AGC) 308 is operative to apply updated automatic gain control values to the VGA based on the range of digitized ADC values. In one example of the invention, the AGC controller increases the VGA gain when the digitized ADC output occupies less than 50% of the ADC output range, and decreases the VGA gain with the digitized ADC output is more than 50% of the ADC output range. For example, for a 12 bit signed ADC, the maximum positive value is 0x3FF, 50% of this value is 0x1FF where the 0x prefix indicates well-known hexadecimal notation. The AGC controller is operative to provide an AGC gain value in a variety of different methods. In one method, a previous AGC value associated with a previous packet is used as a an initial gain value for a current packet, and the AGC controller determines whether to terminate the AGC process based on a signal level requiring a few steps of gain adjustment or no adjustment. In another method, the AGC gain value is set in a series of steps according to a binary In the present invention, depending on connection status and signal or interference levels, the receiver is powered on a receiver powerup delay after the expected start of packet preamble, and the receiver is enabled with the AGC process performed on the later part of the preamble and optionally part of the header (including a destination address such as the AA field), or only on part of the header including partial AA, so that a partial AA field is available for demodulation and comparison using only the least significant bits of the AA or other layer 2 address from the header. The AGC process is typically not performed during the PDU or while demodulating header address bits, since ADC operations resulting in more than 6 dB gain changes tend to corrupt the demodulation of GFSK and other types of modulation during gain transitions.

The AGC processor 308 is configured to determine the gain values for a current received part of the packet based on the part of the preamble or on the part of the packet header including AA or address field. The AGC gain values are applied on a remaining part of the packet. In an example time slotted communication protocol such as Bluetooth, the channel characteristic between the communicating devices does not change very fast and packet to packet gain adjustments are not necessary, such as in the example where the channel attenuation changes by less than 6 dB from packet to packet, and the AGC gain level need not change, or the old gain value can be applied with an incremental increase or decrease in gain for a subsequent packet. The gain values are determined by the AGC processor 308 which stores the gain value in a memory. In one example of the invention, separate gain values are used for each group of frequency channels, and since the frequency hopping sequence is known a-priori, a previously stored AGC gain value associated with a particular group of frequency channels of the next packet receive event are used. The gain values corresponding to all frequency channel groups are obtained and stored in a memory of AGC processor 308 which is configured to fetch the gain values to be applied on the current received part of the packet in the frequency channel from the memory. An observed stability of the channel characteristic by the AGC processor thereby allows the receiver to skip the AGC process entirely when the signal level for each group of channels varies less than a threshold value such as 6 dB. In another example of the invention, the AGC processor 308 updates the memory containing the gain values corresponding to each frequency channel group every 10 seconds by enabling the receiver during the preamble interval and updating the AGC gain value for each separate frequency channel group.

The packet demodulator 312 demodulates the symbol stream (such as GFSK for Bluetooth and ANT) into a bit stream so that the layer 2 address (such as the AA for Bluetooth or Destination ID for ANT) are available to the DA comparator 326, and bit stream of the payload is available to a processor or media access controller (MAC), not shown. The DA comparator 326 examines the layer 2 destination address to determine whether the packet destination address matches the assigned station address. The DA comparator 326 has various modes which provide the examination of all bits of the layer 2 address, or examination of only the least significant (last received) bits of the layer 2 address during an interval the receiver is enabled and any prior AGC process operations have completed. In this manner, the DA comparator 326 provides flexibility in performing an address comparison on corresponding parts of the packet header L2 address with the assigned station address. If the corresponding AA and assigned station address bits do not match, a signal is sent to the power controller 316 to power down the receiver (which includes other related packet processing functions), thereby reducing power consumption.

The energy detector, CFO and symbol timing processor 310 utilize the header field for detection of change in energy (to determine start of the packet), symbol timing estimation and correction and center frequency offset correction. In an embodiment, where the time slotted communication system is Bluetooth, timing estimation and correction are required when a sleep clock determining the arrival time of the next anchor point and receiver wakeup is not very accurate compared to start of packet header, and cannot be relied alone to determine this wakeup time accurately to capture required header address bits. The power control 316 is operative to determine the various wakeup and delayed powerup modes for the receiver components such as RF front end 304, ADC 306, and processors 310, 312 and 326.

When the receiver connection state is "not connected", it is preferable to receive and compare all of the bits of the wireless packet layer 2 (header) address. However, when the receiver connection state is "connected", it may be desirable to save power by delaying the receiver powerup (or performing AGC during part of the layer 2 address field) and using a partial layer 2 header address comparison. In one example of the invention, where a partial n bits of layer 2 header address are received and demodulated, a correlation threshold is used to determine an address match based on a percentage of corresponding layer 2 header address bits and assigned device address bits which match compared to the n bits received, and an address match is asserted if more than 85% or 90% of the n bits match. In another example of the invention, the least significant 4 bits of address match have double the weight compared to other more significant bits of an address match. For example, for a Bluetooth address having 32 bits of layer 2 address (AA), and the receiver powered up late to save power and use only 10 bits of AA as received, the most significant 6 bits of address match would each carry equal weight and the least significant 4 bits of address match would carry double weight, so if all received AA bits matched the assigned address, this would result in a perfect match score of 6+4+4=14, and if two of the first 6 bits did not match, the match score would be $12/14$ (85.7%) and still considered a match, whereas if two of the least significant bits of address did not match, the match score would be $10/14$ (71%) and considered not a match.

Additionally, a failed match on a packet where the match is greater than 75% (¾ of the bits match) but less than the threshold required to indicate an address match may result in earlier receiver powerup for a subsequent packet, thereby capturing more bits of packet header address bits on the subsequent packet to reduce the likelihood of error.

The receiver powerup delay can be chosen to include part of a header access address field and the header access address to device address correlation threshold value may depend on this receiver powerup delay. The identifier correlation threshold is based on a number of frequency channels used for hopping which is supported by the communication system. In an embodiment where the protocol of communication is Bluetooth low energy, the total bandwidth is divided into 40 frequency channels. Two communicating devices (a master and a slave station described herein as a "station") shift to a different frequency channel after every connection interval chosen before establishing a connection. If the availability of number of frequency channels used for hopping increases, then the header access address to device address match threshold can be decreased or set to a lower value (as the fewer devices sharing the frequency channel reduce the probability of a device with similar header access address in a frequency channel).

In another embodiment, the communication system may be an ANT (or ANT+) GFSK protocol, which is closely related to BLE. The ANT protocol from Dynastream Innovations company is described in the online specifications found at www-thisisant-com.

The process 209 is repetitive, repeating for each successive timeslot, and initiates at or shortly before a timeslot 204A and 204B of FIG. 2A in step 210, which may be the result of a wake-up event or other power management method generated by controller module 316 which controls application and removal of power from each subsystem.

FIG. 2C shows the signal processing according to the various decisions made in the flowchart of FIG. 2B. A prior art system would be operative over the entire Bluetooth preamble 260 and L2 header 262, optionally also operative over PDU 264 and rejecting the PDU 264 but consuming power where the header access address did not match the device address. If an address match occurs, then power is maintained to the receiver across the entire packet receive event, as shown in waveform 250.

Late receiver powerup with an AGC process is shown in time progression 252 of FIG. 2C, showing a delayed receiver turn on at time 253 with the AGC process performed corresponding to path 224 of FIG. 2B. Depending on the number of AGC process steps required to get the signal level into an acceptable range of the ADC converter (typically starting from a previous AGC gain value), the AGC process may complete before or during the layer 2 header (such as AA 262), resulting in a determination by L2 destination address comparator 326 of FIG. 3 of an address match using all or part of the received address bits compared to the corresponding device address bits at time 265. Upon an address match using the complete or partial L2 address received and compared to the station address, the PDU is demodulated and processed from interval 265 to 267 with the processing elements of the receiver powered on, otherwise the process ends at time 265 with the receiver powered down until the next interval, as shown in steps 218 and 220 in FIG. 2B.

When the AGC process gain correction of previous packets is not required, such as when the ADC output range is less than 6 dB from a target value, so the current gain value can be used and any correction applied to a subsequent packet, the AGC process is not performed at all, and the receiver powers up after the preamble to capture some or all of the L2 header address fields of path 226, shown in FIG. 2C as 263, although the powerup can occur in the interval from 263 to 265 as long as some of the L2 header address bits are captured in this mode, corresponding to 226 and 216 of FIG. 2B, where an L2 match is performed 218 and the PDU is received and processed 222 from interval 265 to 267 of 218 and 222 of FIG. 2B, or the receiver powers down of 220 in FIG. 2B.

In the case where both the AGC process is skipped and the L2 header address comparison is also skipped, shown as sequence 256 of FIG. 2C, the receiver powers up shortly before time 265 of FIG. 2C, corresponding to path 228 of FIG. 2B. This case has the maximum power savings, and is typically used where a master is connected to a single slave device with no other interferers and with a consistent signal level, and the power reduction for each packet is the receiver power consumption that would have been consumed from 261 to 265.

In another case, where there is a connection from a master to a single slave device with no other interferers but a variation in the signal strength is detected, such as more than 6 dB signal variation from packet to packet, the sequence of 258 of FIG. 2C may be used. In this case, the receiver is powered up long enough to perform an AGC process at any time during the preamble or header access address field as shown in waveform 258 (optionally without reading the AA field), after which the receiver is powered down, and then powered up again at time 265 to receive and process the PDU, after which the receiver is powered down.

In another example of the invention for a time slotted Bluetooth low energy (BLE) protocol, the receiver wake up during intervals as performed by controller 316 of FIG. 3 may occur using anchor points 204A and 204B of FIG. 2A from a sleep state (or low power state) in order to receive the packet from the master. The time duration between two 204A and 204B anchor points will accordingly be multiples of 1.25 ms. The receiver powerup delay in this case starts from the beginning or starting point of a receive station time slot such as 204A or 204B. In an embodiment where the time slotted communication system is Bluetooth low energy (BLE), the receiver powerup delay from time 261 before starting an AGC process may be in the range of 0 to 40 us (between 261 and 265), corresponding to a part of or the entirety of a preamble duration of 8 us plus the duration of a header access address duration of 32 us.

In an embodiment where the time slotted communication system is Bluetooth long range (BLR), the packet duration of FIG. 1 has different time scales, with the preamble 102 having a length of 10 bytes (80 us) and the header access address 104 having a length of 32 bytes (256 us). Accordingly, for BLR, the receiver powerup delay for starting an AGC process late, such as progression 252 is in the range of 0 to 336 us after 261, corresponding to 80 us of preamble followed by 256 us of header access address. The range of receiver powerup delay from 261 may alternatively be a function of the frequency channel, or it may be selected based on an interference level in the frequency channel. In one example, the frequency channels are grouped and assigned a receiver powerup delay value based on the interference level observed on at least one frequency channel in the group, where the frequency channel group with higher interference level is assigned a lower receiver powerup delay value compared to a frequency channel group with lower interference level. A smaller value of receiver powerup delay implies a larger amount of pre-data portion of the packet is received by the receiver to compensate for the increased interference.

The AGC process of step 214 and performed by AGC processor 308 may have a variable length or variable number of gain setting steps, depending on the history of receiver gain required. In one example embodiment of AGC, a nominal median value of receiver gain is set by the AGC processor 308, the output of the ADC 306 is read to determine whether more or less gain should be applied, and gain is changed by the AGC processor 308 such as by a binary successive approximation process, where the gain change with each step is half of the gain change of a previous step until either a particular number of gain change/ADC measurements are completed or a target signal range such as maximum 50% or 90% of full scale ADC range is reached prior to completion of all of the successive approximation steps. In another example, a previous AGC value is used as a starting AGC value, and the AGC process completes when the signal level is iteratively adjusted and within a desired level, such as the maximum signal being within 50% of the maximum output of the ADC, indicating the strongest part of the signal is being digitized in the linear range of the ADC. This AGC process may be performed on the preamble alone, from time 261 to 263 of FIG. 2C, or it may be performed in part of the preamble and part of the header access address fields, as shown in progression 252 of FIG. 2C.

In an embodiment where the time slotted communication is Bluetooth, the channel between the communicating devices does not change more than 6 dB over multiple packet reception events from a master. In such a case, the iterative process of AGC (214) to compute required gain for each new packet is avoided. The CFO, timing compensation and AGC gain values are determined by the processing module 310 and AGC processor 308 respectively, on the current received part of the packet in a frequency channel and the gain values are stored in a memory. Once the CFO, timing compensation values and AGC gain values corresponding to all frequency channel groups are obtained and stored in a memory, such as one maintained by the AGC processor 308, the gain values to be applied on the current received part of the packet in the frequency channel are fetched from the memory. The gain values fetched from the memory for the packet in the frequency channel are the gain values determined by the automatic gain controller on at least a part of one previous packet in the same frequency channel. The gain values at the receiver fetched from the memory are the initial estimate of the gain values for use by the AGC processor 308, and the AGC processor then adjusts the residual gain required, if needed, by operating on the part of packet corresponding to preamble or header access address. As the gain values corresponding to a frequency channel are available in memory, the receiver powerup delay can be non-zero and thus power is saved at the receiver by not receiving/processing a part of the packet. The gain values in memory, corresponding to all frequency channel groups can be updated on the order of every 10 seconds by choosing the receiver powerup delay such that part of packet includes pre-data portion.

The demodulator 312 output is coupled to additional data processing such as a MAC or processor by additional layers as is known in the art of Bluetooth protocol packet transport.

The preceding description provides examples of operation carrying out the present invention which are illustrative of the principles of the present technique and not in limitation thereof, since the present technique is defined solely by the claims.

I claim:

1. A method for reducing power consumption in a time slotted communication system, the communication system comprising:
   an RF front end coupled to an analog to digital converter (ADC), the RF front end receiving a packet having a preamble, a header containing a destination address, and a packet data unit (PDU);
   a power controller, an AGC processor, and a packet demodulator coupled to an output of the ADC;
   a destination address comparator coupled to the output of the packet demodulator;
   the method comprising:
   the power controller applying power to the RF front end after a receiver powerup delay from a start of a time slot, the RF front end receiving power after a start of the preamble;
   the AGC processor performing a gain adjustment to the RF front end based on a signal level at an output of the ADC during either a preamble duration or a subsequent header address duration;
   the destination address comparator comparing fewer than all bits of a header destination address with corresponding bits of an assigned station address; and,
   the power controller maintaining power to the RF front end and ADC when the fewer than all bits of the header destination address match corresponding bits of the assigned station address.

2. The method of claim 1 where the receiver powerup delay is approximately equal to a duration of the preamble.

3. The method of claim 1 where the receiver powerup delay is greater than a duration of the preamble plus part of a duration of the header.

4. The method of claim 1 where the AGC processor uses a previously saved value of gain to the RF front end, and the receiver powerup delay is substantially equal to a duration of time of the preamble and the header.

5. The method of claim 1 where the RF front end applies power only during a duration of the PDU.

6. The method of claim 1 where the power controller removes power from the RF front end when the fewer than all bits of the header destination address do not match corresponding bits of the assigned station address.

7. The method of claim 1 where the fewer than all bits of the header destination address match corresponding bits of the assigned station address when more than 85% of the fewer than all bits of the destination address match corresponding bits of the assigned station address.

8. The method of claim 1 where the preamble and the header correspond to a Bluetooth protocol or an ANT protocol.

9. The method of claim 1 where the destination address comparator is operative over all of the bits of a destination address of the header when the communication system is not in a connected state to a master.

10. The method of claim 1 where the AGC processor is operative during part of the header field and the destination address comparator is operative over a remaining part of the header field.

11. The method of claim 1 where the destination address comparator applies greater weight to at least one least significant bit than at least one more significant bit of the partial destination address.

12. The method of claim 1 where the AGC processor maintains a previously determined gain value for each of several frequency bands, and applies an associated gain value for a frequency band in use for a current packet.

13. The method of claim 1 where the receiver powerup delay is longer when a signal level is greater or interference level is lower than when a signal level is lower or interference lever is higher.

14. A communication station for a time slot communication system comprising:
    an RF front end coupled to an analog to digital converter (ADC), the RF front end receiving a wireless packet having a preamble, a header, and a packet data unit (PDU);
    a power controller, AGC processor, and packet demodulator coupled to an output of the ADC;
    a destination address comparator coupled to the output of the packet demodulator;
    the power controller operative to apply power to the RF front end after a receiver powerup delay from a start of a time slot, the RF front end having power applied after a start of reception of the preamble;
    the AGC processor performing a gain adjustment to the RF front end based on a signal level at the output of the ADC during either a preamble interval or a subsequent header interval;
    the destination address comparator comparing fewer than all bits of a destination address of the header with corresponding bits of an assigned station address; and,
    the power controller maintaining power to the RF front end and ADC only when the fewer than all bits of the header destination address match corresponding bits of the assigned station address.

15. The communication station of claim 14 where the receiver powerup delay is approximately equal to a duration of the preamble.

16. The communication station of claim 14 where the receiver powerup delay is greater than a duration of the preamble plus part of a duration of the header.

17. The communication station of claim 14 where the AGC processor uses a previously saved value of gain applied to the RF front end, and the receiver powerup delay is substantially equal to a duration of the preamble and a duration of the header.

18. The communication station of claim 14 where the RF front end has power applied only during an interval corresponding to the PDU.

19. The communication station of claim 14 where the power controller removes power from the RF front end when the fewer than all bits of a destination address do not match corresponding bits of the assigned station address.

20. The communication station of claim 14 where the fewer than all bits of a destination address match corresponding bits of the assigned station address when more than 85% of the corresponding bits match.

21. The communication station of claim 14 where the preamble and the header correspond to a Bluetooth or ANT protocol.

22. The communication station of claim 14 where the destination address comparator is operative over all of the bits of a destination address of the header when the communication system is not in a connected state to a master.

23. The communication station of claim 14 where the AGC processor is operative during part of the header field and the destination address comparator is operative over a remaining part of the header field.

* * * * *